R. HUFF.
RADIATOR SUPPORT FOR MOTOR VEHICLES.
APPLICATION FILED JULY 30, 1910.
1,067,737.
Patented July 15, 1913.
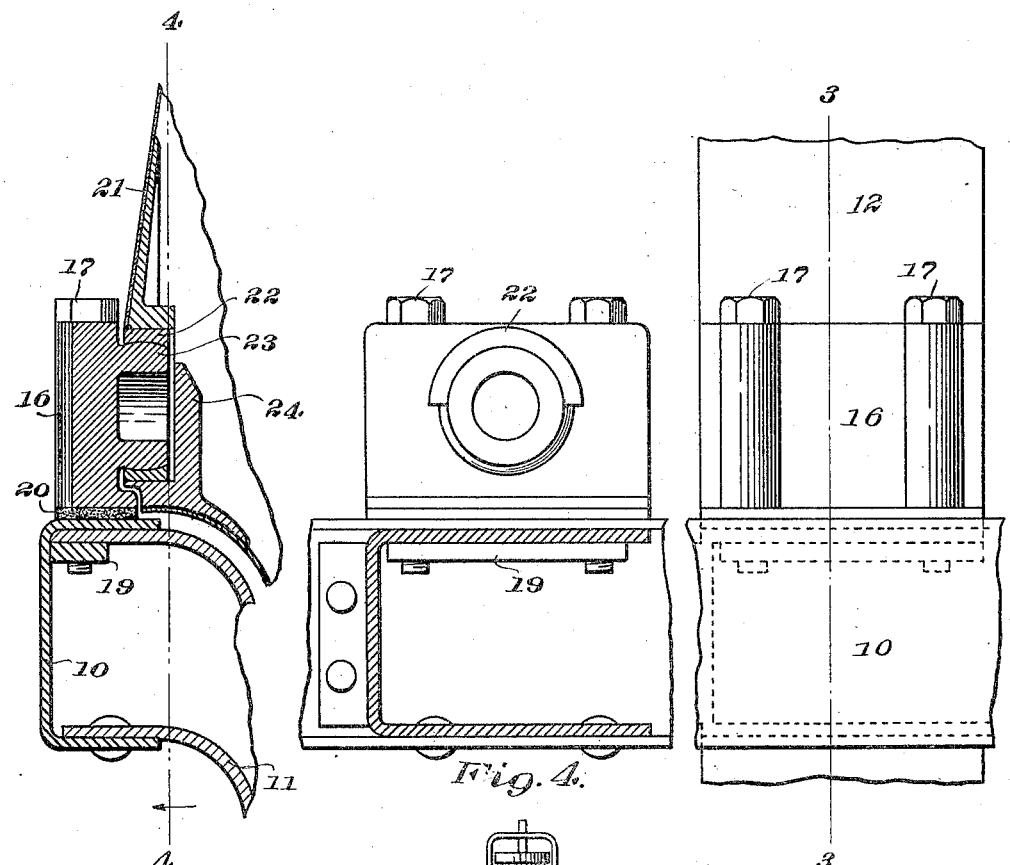
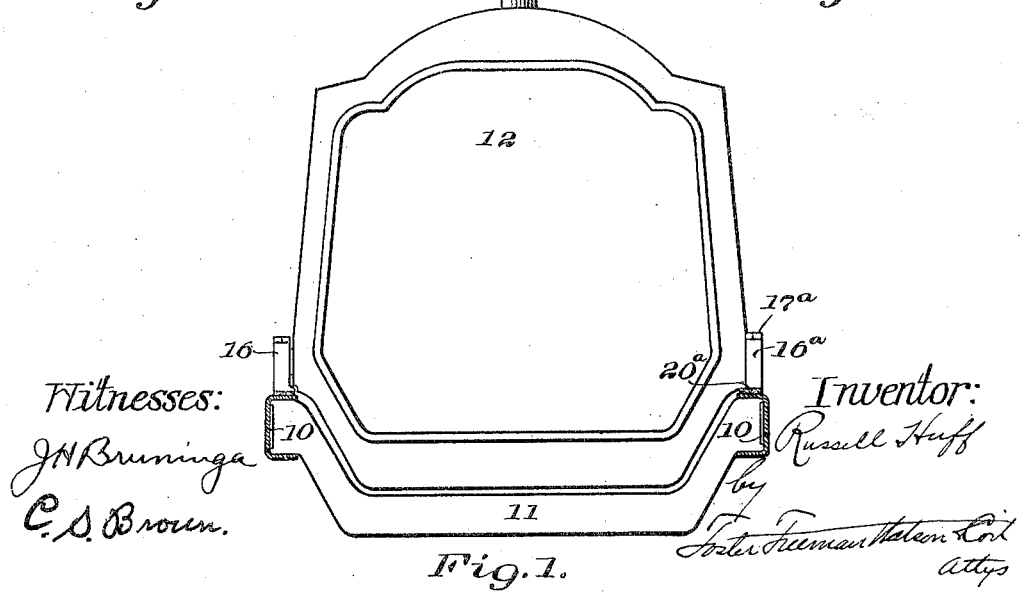

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

RADIATOR-SUPPORT FOR MOTOR-VEHICLES.

1,067,737.  Specification of Letters Patent.  Patented July 15, 1913.

Application filed July 30, 1910. Serial No. 574,733.

*To all whom it may concern:*

Be it known that I, RUSSELL HUFF, a citizen of the United States, and resident of Detroit, Wayne county, State of Michigan, have invented certain new and useful Improvements in Radiator-Supports for Motor-Vehicles, of which the following is a specification.

This invention relates to motor vehicles and particularly to means for supporting the radiator from the vehicle frame.

One of the objects of this invention is to provide simple and efficient means for supporting the radiator so that the twisting movements of the frame will not be communicated to the radiator so as to loosen its joints.

Another object is to construct the supporting means so that it will support the radiator against tipping movement.

Further objects will appear from the detail description, taken in connection with the accompanying drawings, in which—

Figure 1 is a front elevation of the radiator and side bars of a motor vehicle, the side bars being shown in section; Fig. 2 is a side elevation showing one of the supporting brackets; Fig. 3 is a section on the line 3—3, Fig. 2; and Fig. 4 is a section on the line 4—4, Fig. 3, looking in the direction of the arrow.

Referring to the accompanying drawings, 10 designates the side bars of a motor vehicle, and 11 the cross bar connecting the side bars and conforming to the shape of the radiator 12 supported on the side bars substantially above the cross member 11. A bracket 16 is secured to one of the side members by means of bolts 17 passing through the upper flanges of the side member 10 and the cross member 11, and threaded into a bar 19. A strip of leather 20 is interposed between the bracket 16 and the side member. A bracket 21 is secured to the radiator frame and is provided with a socket arranged to receive a bearing sleeve or bushing 22 which is provided with a concave bearing seat arranged to engage a convex bearing face on a trunnion 23 integral with the bracket 16. The bearing sleeve is split longitudinally and is arranged to slide longitudinally in the socket in the bracket 21, and the bracket is provided with a stop 24 which limits the inward movement of the bearing sleeve in its socket. The other side of the radiator is supported from the side bar by a bracket 16$^a$ which is bolted to the side member 10 by means of bolts 17$^a$ similar to that shown in Fig. 3. In this case, however, the bracket 16$^a$ is rigidly connected to the radiator frame by being bolted thereto or in any other suitable manner. There is thus a rigid connection between the right hand end of the radiator and the side member 10, but the leather strip 20$^a$ interposed between the bracket and the side member permits of a slight relative movement between these two members. It will thus be seen that the radiator is supported from the side bars by means of a substantially rigid connection to one of the side bars and by a flexible connection to the other. This flexible connection being a universal joint connection, the convex concave bearing surfaces of the trunnion and the sleeve or bushing 22 permit play between the radiator and the frame, so that the twisting movement of the frame will not be communicated to the radiator so as to break open soldered joints. This construction has the additional advantage that no auxiliary support need be provided for supporting the radiator against forward and backward tipping movement. In prior constructions, it has been found necessary to provide a tie-rod or the like which connects the top of the radiator with the dash. In this construction, the tie-rod can be dispensed with, in view of the rigid connection to one of the side bars, and at the same time the flexible connection to the other side bar prevents transmission of the twisting movements to the radiator frame.

The construction of the sleeve or bushing 22 permits the parts to be readily disassembled by unbolting the bracket 16 and removing the bracket and its trunnion with the split sleeve from the socket in the bracket 21 when the sleeve can be readily removed. When the bushing and trunnion are in place, the stop and the inner face of bracket 16 prevent removal thereof and hold it in position. In Fig. 4, the bracket is shown removed from the radiator and one of the parts of the split sleeve has also been removed leaving only the upper one in place. By projecting the trunnion inwardly the outer face of the bracket is left smooth, resulting in a neat construction.

It is obvious that various changes may be made in the details of construction without departing from this invention, and it is, therefore, to be understood that this invention is not to be limited to the specific construction shown and described.

Having thus described the invention, what is claimed is:

1. In a motor vehicle, the combination with the frame having side bars, and a radiator, of a flexible connection between the radiator and one of said side bars, and a substantially rigid connection between the radiator and the other of said side bars.

2. In a motor vehicle, the combination with the frame having side bars, and a radiator, of a flexible connection between the radiator and one of said side bars, and a connection between the radiator and the other of said side bars constructed to support said radiator against tipping longitudinally of the vehicle.

3. In a motor vehicle, the combination with the frame having side bars, of a radiator, and means for supporting said radiator on said side bars and including a universally yieldable connection with one of the side bars and a connection with the other side bar yieldable in but one direction.

4. In a motor vehicle, the combination with the frame having side bars, of a radiator, and means for supporting said radiator including a universal joint connection with one of the side bars and a connection with the other side bar, preventing the radiator from tipping longitudinally of the vehicle, and cushioning means in said connections.

5. In a motor vehicle, the combination with the frame having side bars, and a radiator, of means for supporting said radiator on said side bars including a universal joint connection to one of said side bars and a substantially rigid connection to the other of said side bars.

In testimony whereof I affix my signature in presence of two witnesses.

RUSSELL HUFF.

Witnesses:
W. H. FINCKEL, Jr.,
C. I. DALE.

---

Copies of this patent may be obtained for five cents each, by addressing the "Commissioner of Patents, Washington, D. C."